United States Patent
Lewis et al.

(10) Patent No.: US 11,966,433 B1
(45) Date of Patent: *Apr. 23, 2024

(54) SUBSCRIBE TO PEOPLE IN VIDEOS

(71) Applicant: Google LLC, Mountain View, CA (US)

(72) Inventors: Justin Lewis, Marina del Rey, CA (US); Kevin Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,305

(22) Filed: Sep. 26, 2022

Related U.S. Application Data

(63) Continuation of application No. 16/284,488, filed on Feb. 25, 2019, now Pat. No. 11,455,327, which is a continuation of application No. 14/283,507, filed on May 21, 2014, now Pat. No. 10,216,737.

(51) Int. Cl.
    *G06F 16/48* (2019.01)
    *G06F 16/435* (2019.01)
    *G06F 16/9032* (2019.01)

(52) U.S. Cl.
    CPC .......... *G06F 16/48* (2019.01); *G06F 16/435* (2019.01); *G06F 16/90324* (2019.01)

(58) Field of Classification Search
    CPC ... G06F 16/48; G06F 16/435; G06F 16/90324
    USPC .......................................................... 707/738
    See application file for complete search history.

(56) References Cited

U.S. PATENT DOCUMENTS

| | | | |
|---|---|---|---|
| 9,037,460 B2* | 5/2015 | Luan | G10L 15/083 707/738 |
| 2007/0094304 A1* | 4/2007 | Horner | G06Q 10/10 |
| 2009/0150406 A1* | 6/2009 | Giblin | G06Q 40/12 707/999.102 |
| 2010/0005106 A1* | 1/2010 | Carter | G06F 16/955 707/E17.112 |
| 2010/0293195 A1* | 11/2010 | Houghton | G06F 40/295 707/765 |
| 2011/0321072 A1* | 12/2011 | Patterson | H04N 21/239 725/5 |
| 2012/0239661 A1* | 9/2012 | Giblin | G06F 3/04842 707/E17.031 |

* cited by examiner

*Primary Examiner* — Joshua Bullock
(74) *Attorney, Agent, or Firm* — Lowenstein Sandler LLP

(57) ABSTRACT

A computer-implemented method for enabling users to subscribe to people and other tagged entities is provided herein. Such a method includes maintaining subscription data specifying a plurality of entities subscribed to by a plurality of users, with each of the plurality of entities being a tagged entity associated with a tag. The method further includes identifying a media item associated with one or more tagged entities of the plurality of entities, determining, based on the subscription data, a user of the plurality of users that is subscribed to the tagged entities of the media item, and providing the media item to the user.

20 Claims, 8 Drawing Sheets

400

┌──────────────────────────────────────────────────────────────────────────────┐
│ Maintain subscription data specifying a plurality of entities subscribed to by a plurality of users, each of │
│ the plurality of entities being a tagged entity associated with a tag        │
│                                                                         402  │
└──────────────────────────────────────────────────────────────────────────────┘
                                       ▼
┌──────────────────────────────────────────────────────────────────────────────┐
│ Identify a media item associated with the one or more tagged entities of the plurality of entities │
│                                                                         404  │
└──────────────────────────────────────────────────────────────────────────────┘
                                       ▼
┌──────────────────────────────────────────────────────────────────────────────┐
│ Determine, based on the subscription data, a user of the plurality of users that is subscribed to the │
│ tagged entities of the media item                                            │
│                                                                         406  │
└──────────────────────────────────────────────────────────────────────────────┘
                                       ▼
┌──────────────────────────────────────────────────────────────────────────────┐
│ Provide the media item to the user                                           │
│                                                                         408  │
└──────────────────────────────────────────────────────────────────────────────┘

Identify a tag that is subscribed to by a user of a content-sharing platform
502

Recommend a channel of media items includes one or more media items having the tag
504

Subscribe the user to the channel
506

SUBSCRIBE TO PEOPLE IN VIDEOS

RELATED APPLICATIONS

This application is a continuation application of co-pending U.S. patent application Ser. No. 16/284,488, filed Feb. 25, 2019, which is a continuation of U.S. patent application Ser. No. 14/283,507, filed May 21, 2014, now U.S. Pat. No. 10,216,737, each of which is incorporated herein by reference.

TECHNICAL FIELD

This disclosure relates to the field of content-sharing platforms and, in particular, to providing and recommending media items according to users' preferences.

BACKGROUND

On the Internet, content-sharing platforms, like social networks and others, allow users to connect to and share information with each other. Many social networks include a content-sharing aspect that allows users to upload, view, and share content, such as video content, image content, audio content, and so on (which may be referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smartphones, cellular phones, laptop computers, desktop computers, netbooks, and tablet computers) to access the content-sharing platforms to use, play, and/or consume media items (e.g., watch digital videos, and/or listen to digital music).

As the volume of content available on a content-sharing platform increases it may become increasingly difficult for a particular user of the platform to find the content that most interests that user. While efforts have been untaken to employ the expressed preferences of the user in making recommendations and efforts have been made to organize content in ways that facilitate their discovery, these efforts have not been entirely satisfactory.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a computer-implemented method enables users to subscribe to people and other tagged entities. Such a method includes maintaining subscription data specifying a plurality of entities subscribed to by a plurality of users, with each of the plurality of entities being a tagged entity associated with a tag. The method further includes identifying a media item associated with one or more tagged entities of the plurality of entities, determining, based on the subscription data, a user of the plurality of users that is subscribed to the tagged entities of the media item, and providing the media item to the user. Other associated systems and methods are also provided.

In another implementation, a system facilitates the subscription to people and other tagged entities in a content-sharing or content-distribution platform. The system includes a memory storing instructions thereon and a processing device communicably coupled to the memory. The processing device executes the instructions to maintain subscription data specifying a plurality of entities subscribed to by a plurality of users, each of the plurality of entities being a tagged entity associated with a tag, and to identify a media item having one or more tagged entities of the plurality of entities. The processing device also executes the instruction to determine, based on the subscription data, a user of the plurality of users that is subscribed to the tagged entities of the media item and to provide the media item to the user.

In additional implementations or embodiments, computing devices for performing the operations of the above-described implementations are also disclosed. Additionally, in some implementations of the disclosure, a non-transitory computer-readable storage medium stores instructions for performing the operations of the above described implementations.

BRIEF DESCRIPTION OF THE DRAWINGS

The present disclosure is illustrated by way of example, and not by way of limitation, in the figures of the accompanying drawings.

FIG. 4A is a flow diagram illustrating a method of providing tagged entities for subscription by a user of a content-sharing platform according to some embodiments of the disclosure.

Figure 1:
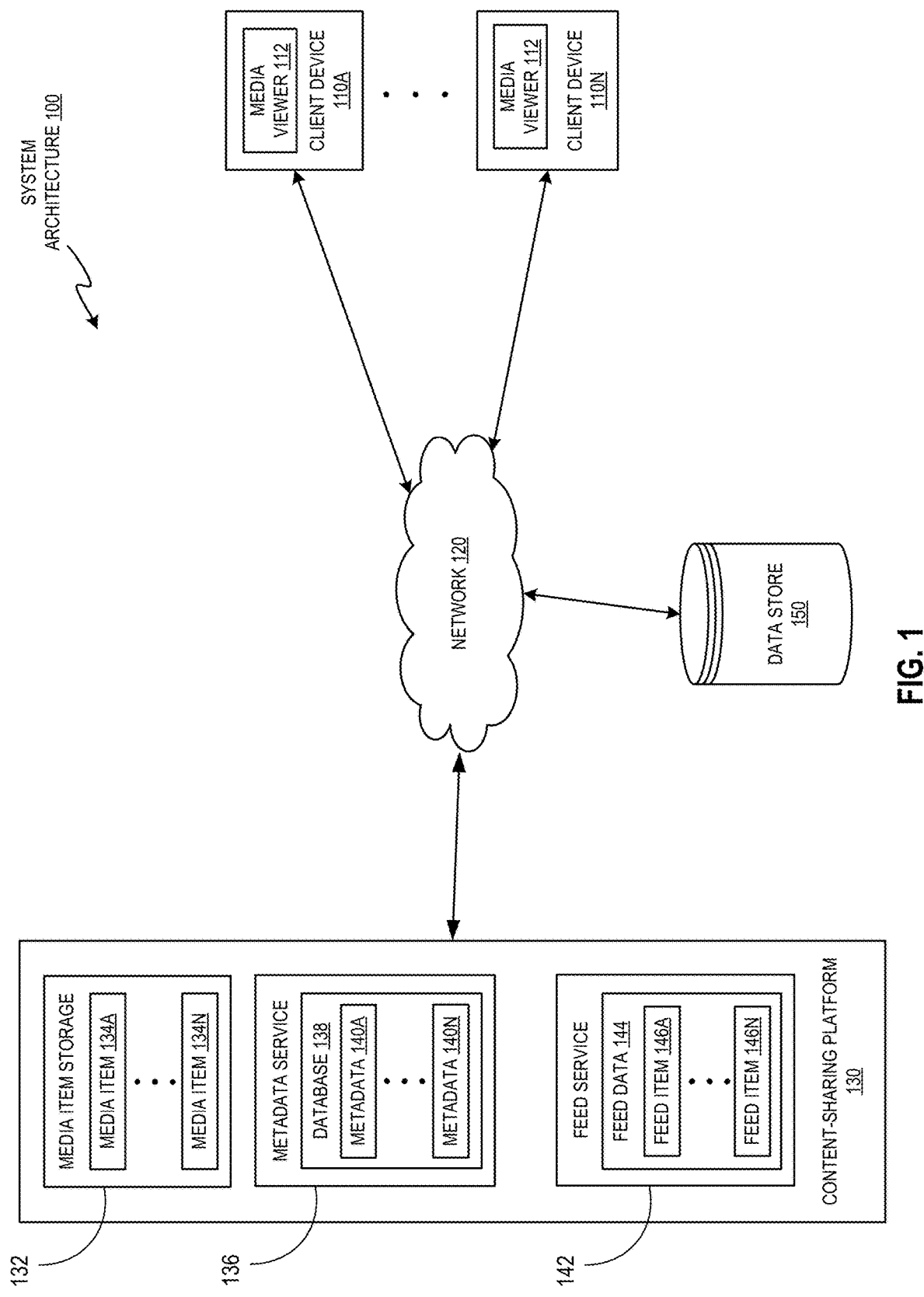
FIG. 1 illustrates an exemplary system architecture, in accordance with an embodiment of the disclosure.

These drawing may be better understood when observed in connection with the following Detailed Description.

DETAILED DESCRIPTION

Implementations are described for facilitating users in subscribing to tagged entities pertaining to media items provided by a platform such as a content-sharing platform. Internet-based media platforms have become increasingly important channels for the distribution and consumption of media such as movies, television, videos, music, photography, and text. As more media distribution has migrated onto such platforms, the amount of content available has increased dramatically. In order to best satisfy users of the platform, helping those users to find the content they like most among the total amount of content is increasingly important. As described herein, the use of tags for entities associated with media items may provide a new and useful technique for improved content recommendation.

Implementations of the present disclosure enable a user to subscribe to one or more tagged entities and for media items to be provided to the user according to that subscription. In some embodiments, to subscribe means that the user will be notified of newly added or newly tagged media items that have the tag of the person or entity in metadata. A tagged entity may be a person, an object, a location, a brand, etc. After a user subscribes to a tagged entity, the user's subscription may be recognized by a feed service that then provides one or more media items having the subscribed tagged entity to the users feed. This information may also be used by the content-sharing platform to recommend additional media items that include the tagged entity or are in channels that are related to the tagged entity.

Frequently in this disclosure, examples directed to user-uploaded videos are presented. This is done for ease of explanation of some of the features described herein. However, embodiments with other content are also within the scope of this disclosure, regardless of whether specific examples of such are provided herein.

Thus, in some embodiments, one or more components of the content-sharing platform may monitor the database of media item metadata. The database may include a listing of media items available to users of the content-sharing platform. This listing may be presented as a listing of media item identifiers used by the content-sharing platform. In connection with the listing of identifiers of media items, each media item may be associated with one or more tags. These tags may be brief, text-based descriptors of entities associated with the media item.

For example, a media item having a famous athlete depicted therein may include the name or nickname of the athlete as a tag in associated metadata. Other tags such as the team of the athlete, jersey number, venue, etc. may also be included in the metadata. The athlete may be depicted or otherwise associated with hundreds or thousands of media items present in the content-sharing platform. The athlete may also have a personal media channel to which the athlete uploads or posts media items. However, many of the media items depicting the athlete may not have been uploaded by the athlete to his channel. For example, an advertisement in which the athlete appears, which may be owned by its sponsor, may not appear in the athlete's channel. This advertisement, whether including video, audio, or a combination thereof, may be tagged upon upload with the athlete's name.

Among the users of the content-sharing platforms may be a user that is a fan of the athlete, i.e. a "fanatic user." The fanatic user may view a number of media items tagged with the name of the athlete. A feed service of the content-sharing platform may monitor a consumption history of the fanatic user in order to better recommend content that the fanatic user will consume and enjoy. The feed service may provide for the conversion of a tagged entity (e.g., the tag that is the name of the athlete) into a subscribable element. This subscribable element permits the fanatic user to subscribe to the tagged entity. Because of the prevalence of media items having the tag in the user's consumption history, the feed service may further recommend to the fanatic user that she subscribe to the tagged entity. The feed service may then determine that the fanatic user is subscribed to the athlete and may provide media items having the tagged entity included in associated metadata to the fanatic user's feed. In this way, the user may receive additional tagged content including the advertisement in which the athlete appeared. Upon request by the user to access the media items, they may be provided to the user through a media item view, such as a browser or a mobile application.

Thus, embodiments of the present disclosure may provide for subscription to tagged entities, thereby providing users with additional control and selection in receiving desired content. Additionally, embodiments of the present disclosure may facilitate cross-pollination of channels and other features and cross-promotion on the content-sharing platform.

FIG. 1 illustrates an exemplary system architecture 100 for distribution and displaying of media items, in accordance with an embodiment of the disclosure. The system architecture 100 includes a plurality of client devices 110A through 110N, a network 120, a content-sharing platform 130, and a data store 150. In one embodiment, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 150 may include a memory (e.g., random access memory), a cache, a drive (e.g., a hard drive), a flash drive, a database system, a storage area network (SAN), or another type of component or device capable of storing data. The data store 150 may also include multiple storage components (e.g., multiple drives or multiple databases) that may also span multiple computing devices (e.g., multiple server computers) and storage devices such as may be present in a data center.

The client devices 110A-N may each include computing devices such as personal computers (PCs), laptops, mobile phones, smartphones, tablet computers, wearable computing devices, etc. Client devices 110A-N may be used to consume (e.g., view, hear, etc.) and upload content to the content-sharing platform 130. In some embodiments, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user of a client device. The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application, such as smartphone application, that allows users to view digital media items (e.g., digital videos, digital images, electronic books, shared text, etc.) as part of the content-sharing platform 130.

The media viewers 112 may be provided to the client devices 110A-N by the content-sharing platform 130 and/or a third-party distribution platform. For example, the media viewers 112 may be embedded media players that are embedded in web pages provided by the content-sharing platform 130. In another example, the media viewers 112 may be applications that are downloaded from a server accessible to the client devices 110A-N through the network 120.

In general, functions described in one embodiment as being performed by the content-sharing platform 130 can also be performed on the client devices 110A-N in other embodiments if appropriate. In addition, the functionality attributed to a particular component can be performed by different or multiple components operating together. The content-sharing platform 130 can also be accessed as a service provided to other systems or devices through appropriate application programming interfaces (APIs), and thus is not limited to use in websites.

In some embodiments, the content-sharing platform 130 includes one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a smartphone application that may be used to provide a user with access to the media items.

The content-sharing platform 130 includes a media item storage 132 that includes a plurality of media items 134A through N. Examples of media items 134A-N can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, etc. Of note, the media items 134A-N include metadata, and metadata of at least some media items may include tags representing tagged entities pertaining to those media items. In some embodiments, the content-sharing platform 130 may store the media items 134A-N using the data store 150. The media items 134A-N may be retrieved from data store 150 for delivery (or streamed from the data store 150) to one or more of client devices 110A-N over network 120.

In some embodiments, media items 134A-N may be consumed (e.g., viewed and/or heard) via the Internet and/or via a mobile device application. As used herein, "media," "media item," "online media item," "digital media," "digital media item," "content," and "content item" can include and refer to an electronic file that can be executed, loaded, or played using software, firmware, or hardware configured to present the digital media item to a viewing user of the content-sharing platform 130.

In some embodiments, when a user uploads a media item to the content-sharing platform 130, that user may "tag" one or more entities pertaining to the media item, thereby associating one or more tags with that media item in metadata accessible to the platform 130. The tags may function as brief descriptors of the media item. For example, the tags may identify an entity associated in some capacity with the media item. The entity may be a person heard and/or seen in the media item, a person involved in the creation of the media item, an object appearing in the media item, a location appearing in the media item, a product or brand presented in the media item, or an organization curating the media item.

This metadata may be received, processed, stored, and recalled by a metadata service 136 provided as part of the content-sharing platform 130. As illustrated in FIG. 1, the metadata service 136 includes a database 138 with a plurality of metadata entries, illustrated as metadata 140A-N. Each of the metadata entries in the database 138 may be associated with a single media item of the media items 134A-N. An example of this metadata may be found in the metadata database 138 as illustrated in FIG. 2.

Figure 2:
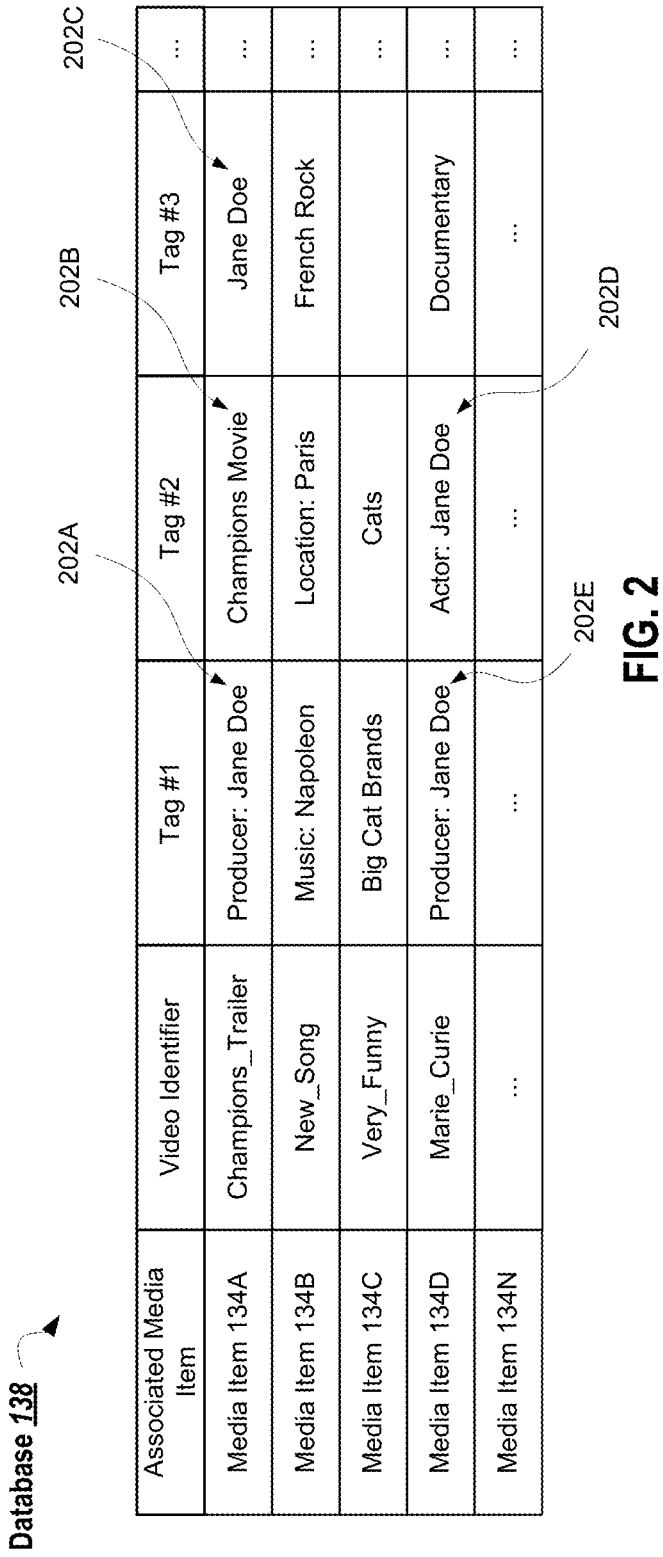
FIG. 2 illustrates an exemplary portion of metadata including one or more tags present in a database in accordance with some embodiments of the disclosure.

FIG. 2 shows an example of the metadata database 138 that includes a plurality of entries associated with media items, each entry including at least an identifier of a media item. Each of the entries may also include one or more tags associated with entities pertaining to the respective media item. The identifiers may be titles, such as a title entered by a user of the content-sharing platform 130. In some embodiments of the metadata database 138, the identifiers may be strings of characters, such as alphanumeric characters and/or other characters that may be included in a uniform resource locator (URL) to facilitate access to the media item by the media viewer 112. In such embodiments, the title of the video or other media item may be included as metadata along with the identifier in the metadata database 138. Many other kinds of metadata may be included in the metadata database 138, such as a type of each media item, a creation or uploading date and time of each media, consumption history identifying one or more users of the content-sharing platform 130 that have consumed media item, etc. Every media item having a metadata entry including metadata stored in the metadata database 138 may not have every kind of metadata stored in association with it.

As shown in FIG. 2, the entry for media item 134A includes an identifier "Champions_Trailer," and a plurality of tags, including tags 202A, 202B, and 202C. The tags 202A-C provide brief descriptors of the media item 134A in general or entities pertaining to the media item 134A specifically. These tags 202A-C, like the other tags in the database 138, may be entered by a user upon upload of the associated media item into the content-sharing platform 130 or may be entered after upload. In some embodiments only the user that uploaded the media item 134A may tag the item at a later time, while in other embodiments additional users may be provided with the ability to tag the media items not uploaded by those additional users in the content-sharing platform 130.

The tag 202A includes information identifying a person (e.g., the name of the person) as well as information identifying a role that the person has or had with respect to the media item 134A. In this instance, the person is a person named "Jane Doe" and the role is that of content producer. Other tags may indicate other roles played by an individual or organization with respect to other media items. For example, a tag may indicate that a specific group or person made the music in a particular media item. Other roles may include director, actor, writer, etc. As is described in more detail below, tags that include both a role and a person or organization may be used to create a tagged entity specific to the combination of role and person or organization. For example, the tag 202D includes a person named "Jane Doe" in the role of actor with respect to the media item 134D. This is distinguishable from the tag 202A that includes the person named "Jane Doe" as a producer of the media item 134A and from the tag 202C which includes "Jane Doe" without reference to any role. An identical tag is associated with the media item 134D as tag 202E. The metadata database 138 shows an example of the inclusion of the tags found in metadata in the content-sharing platform 130. Other formats for inclusion of tags in the metadata may be present in other embodiments. While the metadata database 138 is illustrated in FIG. 1 as being present on the content-sharing platform 130, in some embodiments the database 138 is stored externally to the content-sharing platform 130 and accessible to the content-sharing platform via the network 120. In some embodiments, the metadata database 138 or a subset thereof may be stored on one or more of client devices 110A-N. For example, a user that accesses the content-sharing platform 130 through the client device 110A may have a subset of the database 138, containing information specific to that user such as the user's consumption history, stored on the client device 110A.

Returning to FIG. 1, when a request for one of media items 134A-N is submitted using the client device 110A, the media item may be hosted on the content-sharing platform 130 in the media item storage 132 and/or may be hosted by the data store 150. The media item may be streamed or downloaded to the client device 110A.

As illustrated in FIG. 1, the system architecture 100 further includes a feed service 142 as part of the content-sharing platform 130. The feed service 142 provides feeds for the users of the content-sharing platform 130. The feeds may include one or more media items for each of the users to consume. The feeds may be based on specific requests for certain types of content and may also be based on a history of the media items each user has consumed on the content-sharing platform 130. The feed service 142 may store, collect, and maintain user histories to facilitate in feed management. In this way, the feed service 142 may provide media items in the feed of users that those users are more likely to choose to watch and appreciate. Thus, the feed service 142 includes feed data 144 that may include a plurality of feed items 146A-N. These feed items 146A-N may be references or links to media items to be included in the feeds.

In some embodiments, the feed service 142 may enable and manage a plurality of channels. A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. Channels may be used by content-creating users to facilitate the distribution to an interested users by allowing those users of the content-sharing platform 130 to subscribe to one or more channels. Returning to a previous example, the famous athlete may have a channel by which the athlete shares media items with fans that are users of the content-sharing platform 130. When a user subscribes to the channel, a new media item uploaded to the channel by the channel's operator (e.g., the famous athlete) may be automatically included in the user's feed by the feed service 142.

These feeds may further include recommendations of media items for the users to consume, either directly in the feed or alongside or otherwise in connection with the user's feed in a user interface by which the user interacts with the content-sharing platform 130 to request and consume media items. The recommendations made by the feed service 142 may include individualized recommendations such that a first user receives recommendations that are different from those received by a second user. Additionally, the feed service 142 may provide for the use of tags in selecting media items for a user's feed as a feed item and further may be used in recommending additional media items and/or channels of media items to the user.

Figure 3:
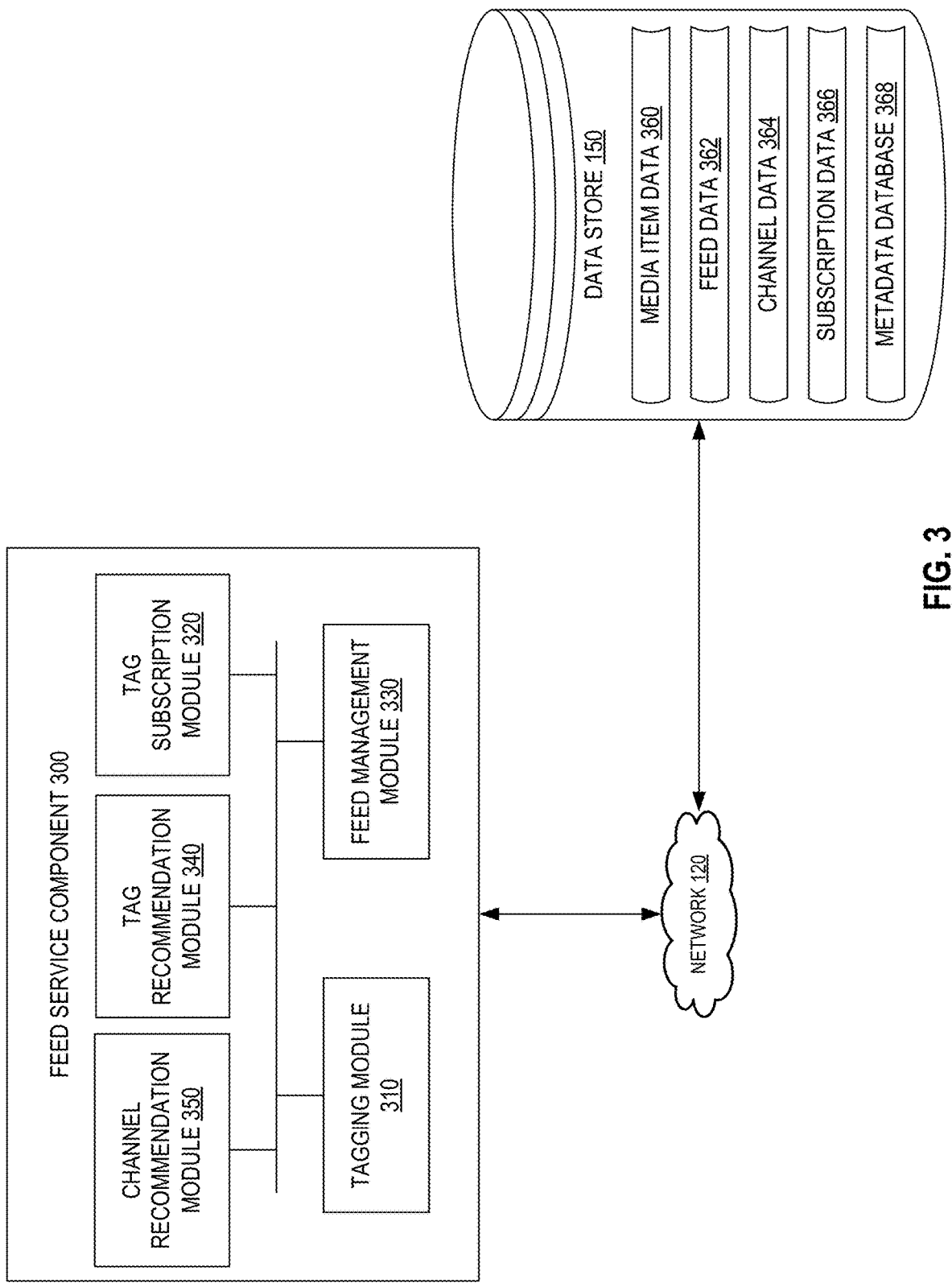
FIG. 3 is a block diagram illustrating a feed service component in accordance with embodiments of the disclosure.

FIG. 3 is a block diagram illustrating a feed service component 300 that may provide the feed service 142 or some of the functions thereof in accordance with embodiments of the disclosure. As illustrated in FIG. 3, the feed service component 300 may operate in communication with the data store 150 over the network 120. In some embodiments, information contained on the data store 150 may be accessible to the feed service component 300 directly from the content-sharing platform 130. For example, the feed service component 300 may access the metadata service 136 and the metadata database 138 on the content-sharing platform 130 or similar information present on the data store 150.

The feed service component 300 includes a tagging module 310. The tagging module permits users of the content-sharing platform 130 to tag entities pertaining to one or more media items. In some embodiments, the user that uploads a media item may tag entities in the media item. In other embodiments, other users may also associate tags with the media items. The resulting tag or tags are stored in association with the media item or items in the data store 150. For the example, the tags may be stored in the metadata database 368.

The feed service component 300 further includes a tag subscription module 320. The tag subscription module 320 may access information on the data store 150 through the network 120, or on the content-sharing platform 130, to permit users of the content-sharing platform 130 to subscribe to tags included in the metadata database 368 and/or database 138 of FIG. 1. In some embodiments, accomplishing this may include accessing the metadata database 368 to identify tags associated with the media items, presenting one or more tags to a user, and subscribing the user to the tags.

For example, when a user views videos associated with a tag, such as tag 202A and tag 202E, above a threshold number of times (e.g., once, twice, one hundred times, etc.), the tag subscription module 320 may automatically subscribe the user to the tag or suggest that the user subscribe to the tag. The tag subscription module 320 may analyze tag subscription data to identify patterns among users. For example, if a threshold quantity or percentage of users that subscribe to tag 202B of FIG. 2 also subscribe to tag 202C, the tag subscription module 320 may recommend subscribing to tag 202C to users that (of these two tags) only subscribe to tag 202B. Some tags may be identified by an administrator or operator of the content-sharing platform 130 as being related in some way. For example, if two musical acts are touring together, the tag subscription module 320 may be configured to recommend users that have subscribed to a tag identifying the first musical act subscribe to the second musical act. When a user watches a media item of either act, tags identifying both acts may be presented to the user as a recommendation.

Thus, a user of the content-sharing platform 130 may request to subscribe to the tagged entity "Producer: Jane Doe." This tagged entity is a person, Jane Doe, in her role as a producer of the media items. The tag subscription module 320 may include an entry in the subscription data 366 that indicates that the user is subscribed to Jane Doe specifically in her role or capacity as producer. A feed management module 330 may recognize "Producer: Jane Doe", and may identify media items in the media item data 360 that are associated with Jane Doe as producer because they include the tag "Producer: Jane Doe" in metadata available in the metadata database 368.

The feed service component also includes the feed management module 330 that may assemble the feeds and associated feed data for the users of the content-sharing platform 130. In some embodiments, the feed of a user may contain references to media items in the feed data 362. In some embodiments, the feed management module 330 may include requested items in a user's feed (e.g. media items with subscribed tags in metadata or from a channel the user has subscribed to, etc.), as well as items that are not requested (e.g., individually recommended items, items including recommended tags, items from recommended channels, etc.).

The feed service component 300, through the feed management module 330, may also have access to channel data 364 that provides for the collection of media items into channels as described herein. Using subscription data 366, the feed management module 330 may identify the channels to which a particular user has subscribed, identify one or more media items included in those channels, and provide those media items or references to those media items to the subscribing user.

This collection of identified media items, or a subset thereof, may then be provided to the user in the user's feed by the feed management module 330. In this way, the feed service component 300 may identify tags and allow users to subscribe to the tags (or tagged entities) like the user can subscribe to a channel, collect media items having the particular tag in metadata, and provide the collected media items to the user in the user's feed.

In addition to permitting users of the content-sharing platform 130 to subscribe to tagged entities as described herein, the feed service component 300 includes a tag recommendation module to suggest or recommend additional tags to users for subscription. The suggestions may be included directly in the users' feeds and identified as suggestions, as distinct from items that the feed management module 330 determines are to be included because of the users' subscriptions. In some embodiments, the suggestions provided by the tag recommendation module 340 may be presented in a user interface alongside, but separate from, a particular user's feed in the user interface, by which the user interacts with the content-sharing platform 130.

In some embodiments, the tag recommendation module 340 may suggest or recommend tagged entities for a user to follow or subscribe to. This may be done by observing a user's preferences as expressed by the user's past consumption. For example, a user's consumption history may include data similar to that seen in the database 138 shown in FIG. 2. The user's consumption history may identify consumed media items with certain associated metadata. By determining the prevalence of each tag in the consumption history, the tag recommendation module 340 may suggest that the user subscribe to or follow the tagged entities identified by the tag. Alternatively, the user's consumption history may merely include identifiers of media items, and the identifiers may then be used to query the metadata database 138 to identity tags associated with each identifier. For example, the tag recommendation module 340 may suggest that a user with a history similar to that shown in FIG. 2, subscribe to Jane Doe in her capacity as producer by subscribing to the "Producer: Jane Doe" tag. After receiving a request from the user to subscribe to "Producer: Jane Doe," the feed management module 330 may include media items that have the "Producer: Jane Doe" tag into the user's feed. As another example, where a user has subscribed to "Producer: Jane Doe," the tag recommendation module 340 may recommend that the user subscribe to "Jane Doe" or "Actor: Jane Doe." Additionally, the tag recommendation module 340 may identify the tags associated with a media item as it is being consumed by a user and, if those tags are subscribable, suggest that the user subscribe to the tags to follow the tagged entities. For example, a user may be watching a video of a famous athlete appearing in the athlete's channel, to which the user already subscribes. The feed suggestion module 330 may identify that the famous athlete is also a tagged entity and suggest that the user follow the famous athlete as a tagged entity, rather than just subscribing to the athlete's channel. This may introduce additional content to the user's feed in which the athlete is tagged, such as an advertisement in which the athlete appears or a video of highlights compiled and uploaded by another user.

A channel recommendation module 350 may also make other types of suggestions to users of the content-sharing platform 130. For example, the channel recommendation module 350 may recommend one or more channels to a particular user based on the tagged entities to which that user has subscribed. For example, after subscribing to the tag "Producer: Jane Doe," the channel recommendation module 350 may suggest that the user subscribe to a channel operated by Jane Doe. The channel recommendation module 350 may suggest that the user subscribe to a channel that frequently includes content produced by Jane Doe or may suggest a channel in which Jane Doe frequently has another role, such as writer, or in which Jane Doe frequently appears as an actor. The media items in the channel operated by Jane Doe may be tagged with various tags (e.g., "Jane Doe", "Producer: Jane Doe", "Actor: Jane Doe", etc.) on upload by Jane Doe. The channel recommendation module 350 may be configured to detect the prevalence of a tag in media items in the channels and then recommend the channels to users that have subscribed to the tag. Thus, a user that has subscribed to a "Jane Doe" tag may receive a recommendation from the channel recommendation module 350 to subscribe to an official channel operated by Jane Doe. Such a threshold frequency may be determined as a percentage of associated media items to total media items in a channel or by some other determination. The recommendation may be provided when the user plays a media item that is both tagged with a tag that identifies a tagged entity and is in the channel being recommended.

The channel recommendation module 350 may also consult a user's consumption history to identify channels to recommend to the user. The channel recommendation module 350 may identify tagged entities that the user may be interested in from counting and processing the tags from the user's consumption history. The channel recommendation 350 may identify channels associated with those tagged entities, using channel data 364, and suggest that the user subscribe to one or more of those channels.

In this way, the feed service component 300 may serve as part of the system architecture 100 of FIG. 1 to enable users to subscribe to tagged individuals or other tagged entities such that media items including the tag in associated metadata. Thus, the system architecture 100 provides a system whereby a tag associated with a plurality of media items may be converted into a subscribable element such that a user can subscribe to the tagged entity associated with the tag. The system architecture 100 can make recommendations to users based on the tags in the users' histories, based on relatedness to other tagged entities or other channels, and based on tags associated with a media item being consumed.

In situations in which the systems discussed here collect personal information about users, or make use of personal information, the users may be provided with an opportunity to control whether the content-sharing platform 130 collects user information (e.g., information about a user's social network, social actions or activities, profession, a user's preferences, a user's current location, or a user's consumption history), or to control whether and/or how to receive content from the content-sharing platform 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content-sharing platform 130.

FIG. 4A is a flow diagram illustrating a method 400 for facilitating the subscription of a user of a content-sharing platform to a tagged entity. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 400 and other methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory, tangible computer-readable device or storage medium. In one embodiment, method 400 may be performed by the content-sharing platform 130 and subsystems thereof as shown in FIGS. 1, 2, and 3.

Embodiments of the method 400 may begin at block 402 when the processing logic maintains subscription data specifying a plurality of entities subscribed to by a plurality of users. Each of the plurality of entities may be a tagged entity associated with a tag. To more clearly describe some embodiments of the method 400, reference is made to some features of FIGS. 1, 2, and 3 and described herein. For example, the feed service component 300 may include a feed management module 330 that collects, maintains, and uses subscription data 366 to determine what items are to be included in users' feeds in the content-sharing platform 130. The tag subscription module 320 may identify a tag associated with an entity and create a subscribable element associated with the tagged entity to which the users may subscribe. Such subscriptions may then be included in the subscription data 366 maintained by the feed management module 330.

The processing logic may maintain the subscription data 366 by performing many other actions and operations. For example, the feed suggestion module 330 of FIG. 3 may recommend to the user that the user subscribe to one or more tagged entities if the associated tags appear in the user's history and the user has not yet subscribed to the tagged entities. The feed management module 330 may receive a request from the user to subscribe to the one or more tagged entities and store an entry in the subscription data 366 that indicates that the user is subscribed to the tagged entities.

Also as part of maintaining subscription data the processing logic may monitor a database of media item metadata, like the metadata database 368 and/or the database 138. The metadata may include one or more tags associated with a plurality of media items available in the content-sharing platform. The processing logic may select at least one of the one or more tags and associate the tag with a subscribable element in the content-sharing platform, to generate a tagged entity that is subscribable by the plurality of users. The subscribable element may be a listing or entry in a table of channel data 364, such that the tagged entity may function as a channel within the content-sharing platform 130, a channel that is managed by the feed service component 300 rather than by a user of the content-sharing platform 130.

At block 404, the processing logic may identify a media item associated with the one or more tagged entities of the plurality of entities. For example, when a user uploads a media item into the content-sharing platform 130, the user may enter one or more tags to be associated with the media item. Also upon upload of the media item, or at a later time, the feed service component 300 may identify the media item as being associated with a tagged entity, e.g. one of the media item's tags may have been associated with a subscribable tagged entity.

At block 406, the processing logic determines, based on the subscription data 366, a user of the plurality of users that is subscribed to the tagged entities of the media item. The feed service component 300, whether by the feed management module 330 or by the tag subscription module 320 may query the subscription data 366 to determine which users have subscribed to the tag identifying the tagged entity. Then, at block 408, the processing logic provides the media item to the user. This may be done by including the media item having the tag in its metadata in the feed of the subscribing user as described herein. Alternatively, a reference or link to the media item may be included in the feed.

Some embodiments of the method 400 may also include operations in which the processing logic identifies a channel of media items, associated with the tag, that includes the media item provided to the user and recommends to the user that the user subscribe to the channel. The channel associated with the tag is generated by the content-sharing platform based on a prevalence of the tag in the database.

Figure 4B:
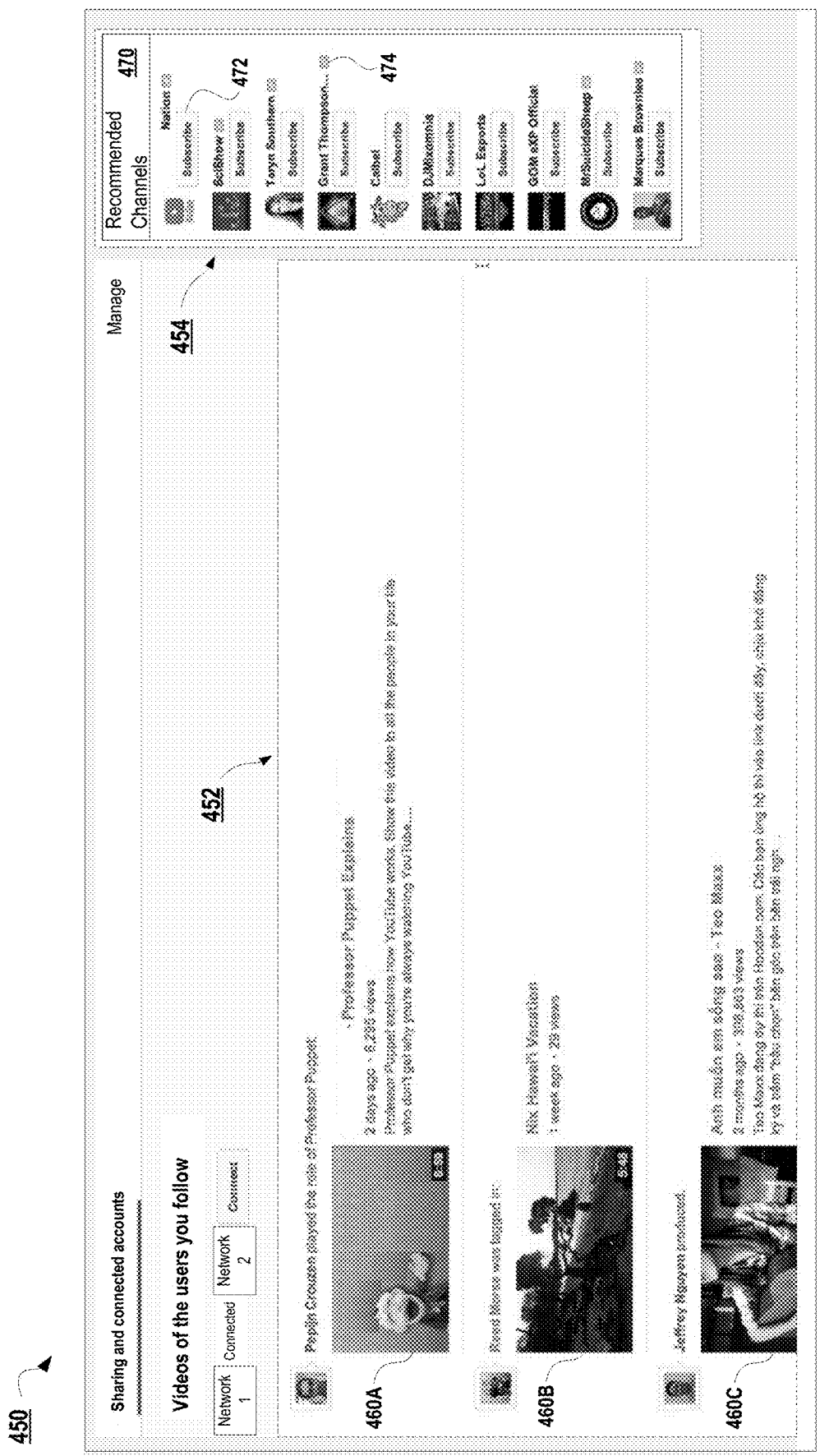
FIG. 4B illustrates an example user interface (UI) 450 for facilitating the subscription of a user of a content-sharing platform to a tagged entity, in accordance with some aspects of the present disclosure.

FIG. 4B illustrates an example user interface (UI) 450 for facilitating the subscription of a user of a content-sharing platform to a tagged entity, in accordance with some aspects of the present disclosure. UI 450 may include area 452 and area 454. Area 452 presents the user's feed with videos 460 associated with tagged entities subscribed by the user. For example, videos 460 may be associated with people that the user is following such as an actor in video 460A, a person participating in an event recorded in video 460B, a producer of video 460C, etc. Area 454 may present a list of recommended channels 470 that were identified using tagged entities as discussed in more detail herein. Each recommended channel 470 may be presented with a subscribe UI control (e.g., a button or check box) 472 that allows the user to subscribe to a respective channel right away. Some of the recommended channels include a visual indicator (e.g., a check mark) 474 that specifies that the channel has been verified by an operator of the content-sharing platform. The verification may indicate that a person or group identified with the channel actually is associated with the channel. For example, the verification communicate to users of the content-sharing platform that the channel is authentically operated.

Figure 5:
FIG. 5 is a flow diagram illustrating a method of recommending a channel to user based on tagged entities according to some embodiments of the disclosure.
Figure 5:

FIG. 5 is a flow diagram illustrating a method 500 for facilitating the subscription of a user of a content-sharing platform to a channel. The method 500 may be performed by processing logic that comprises hardware (e.g., circuitry, dedicated logic, programmable logic, microcode, etc.), software (e.g., instructions run on a processing device to perform hardware simulation), or a combination thereof.

Embodiments of the method 500 may begin at block 502 in which processing logic identifies a tag that is subscribed to by a first user of a content-sharing platform. For example, the tag subscription module 320 of the feed service component 300 shown in FIG. 3 may identify that the user as being subscribed to "Producer: Jane Doe." The channel recommendation module 350 may receive this information from the tag subscription module 320 and identify a channel associated with the tag "Producer: Jane Doe." The channel may include one or more media items that have been associated with the tag.

At block 504, the processing logic may recommend the channel of media items to the user for subscription by the user. For example, the channel recommendation module 350 may determine that the channel is related to the tag and provide the user with a recommendation in a user interface.

At block 506, the processing logic subscribes the user to the channel. Referring to FIG. 3, the feed service component 300 may receive a request from the user to subscribe to the channel. The feed management module 330 may store this channel subscription in the subscription data 366 and use the subscription to provide one or more media items from the channel to the user's feed.

Figure 6:
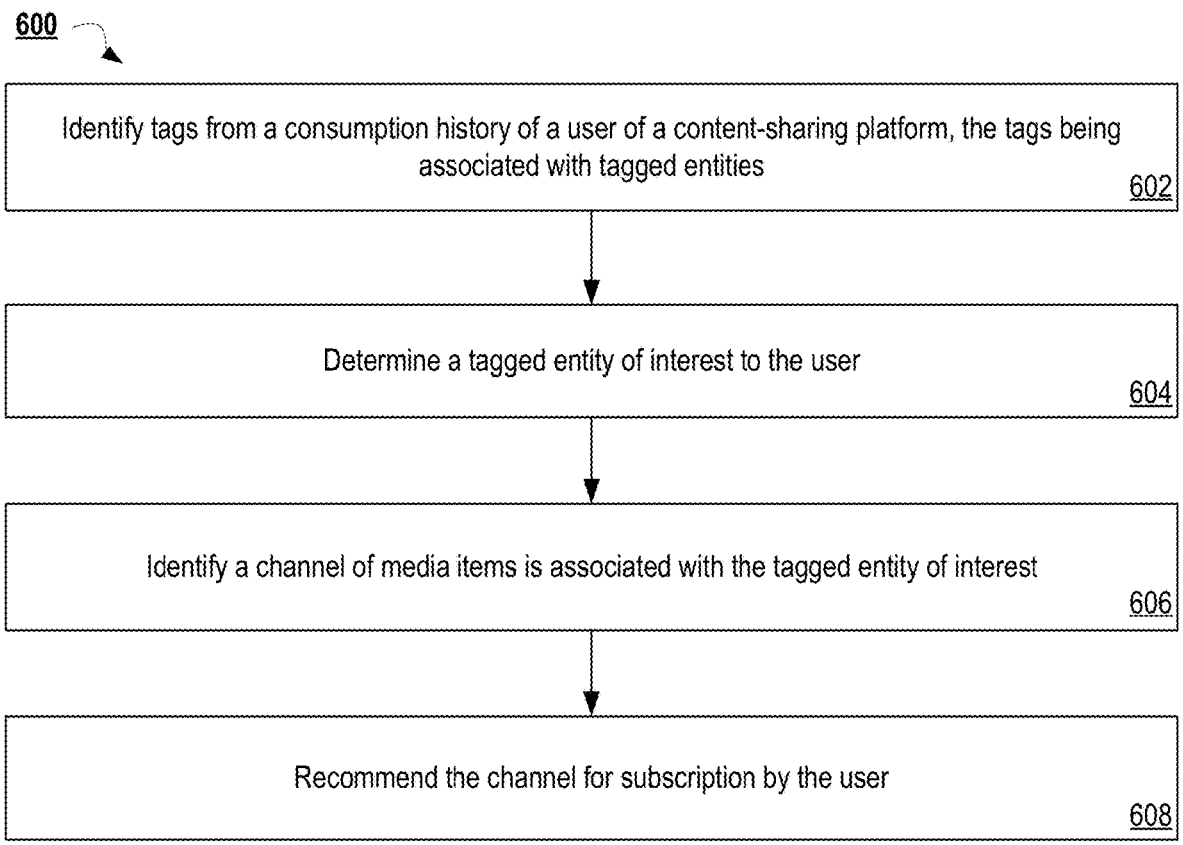
FIG. 6 is a flow diagram illustrating a method of recommending a channel for subscription by a user based on tags in the user's consumption history according to some embodiments of the disclosure.

FIG. 6 is a flow diagram illustrating a method 600 for facilitating the subscription of a user of a content-sharing platform to a channel. The method 600 may be performed by processing logic as described herein.

Embodiments of the method 600 may begin at block 602. At block 602, the processing logic identifies tags from a consumption history of a user of a content-sharing platform. The tags may be associated with tagged entities, such as a person, a place, a product, etc. as described herein. For example, the feed service component 300 of FIG. 3 may identify a plurality of tags in a user's consumption history, which may include a plurality of media item identifiers and tags for at least some of the identified media items.

At block 604, the processing logic determines a tagged entity that is likely to be of interest to the user. This may be done by identifying a tag that appears the most in the user's consumption history, or the ten most frequently appearing tags in the consumption history, etc. In some embodiments, certain tags may be excluded from the determination if the user has already subscribed to channels associated with those tags.

At block 606, the processing logic identifies a channel of media items with the tagged entity of interest. In some embodiments, this may be done by the channel recommendation module 350 searching the channel data 364. The channel data may include a listing of tags in order of the frequency of appearance in media items included in the channel. In this way or in other ways, the relationship of a tag to a channel may be determined. For example, the user may have watched one or more media items having a "Jane Doe" tag in metadata. The "Jane Doe" tag may be associated with a person "Jane Doe". Channel recommendation module 350 may identify a channel that is associated with Jane Doe. For example, the channel may be an official channel operated by Jane Doe, or she may frequently appear in media items in the channel, with her appearances being tagged in the media items.

At block 608, the channel recommendation module 350 recommends the channel for subscription by the user. The recommendation may be provided in the user's feed or in a special feed that includes only recommendations. The recommendation may also be provided in connection with the display of a media item. After receiving the recommendation, the user may choose to subscribe to the channel. In this way, channels of media items may be recommended to a user based tags in on the user's consumption history.

Figure 7:
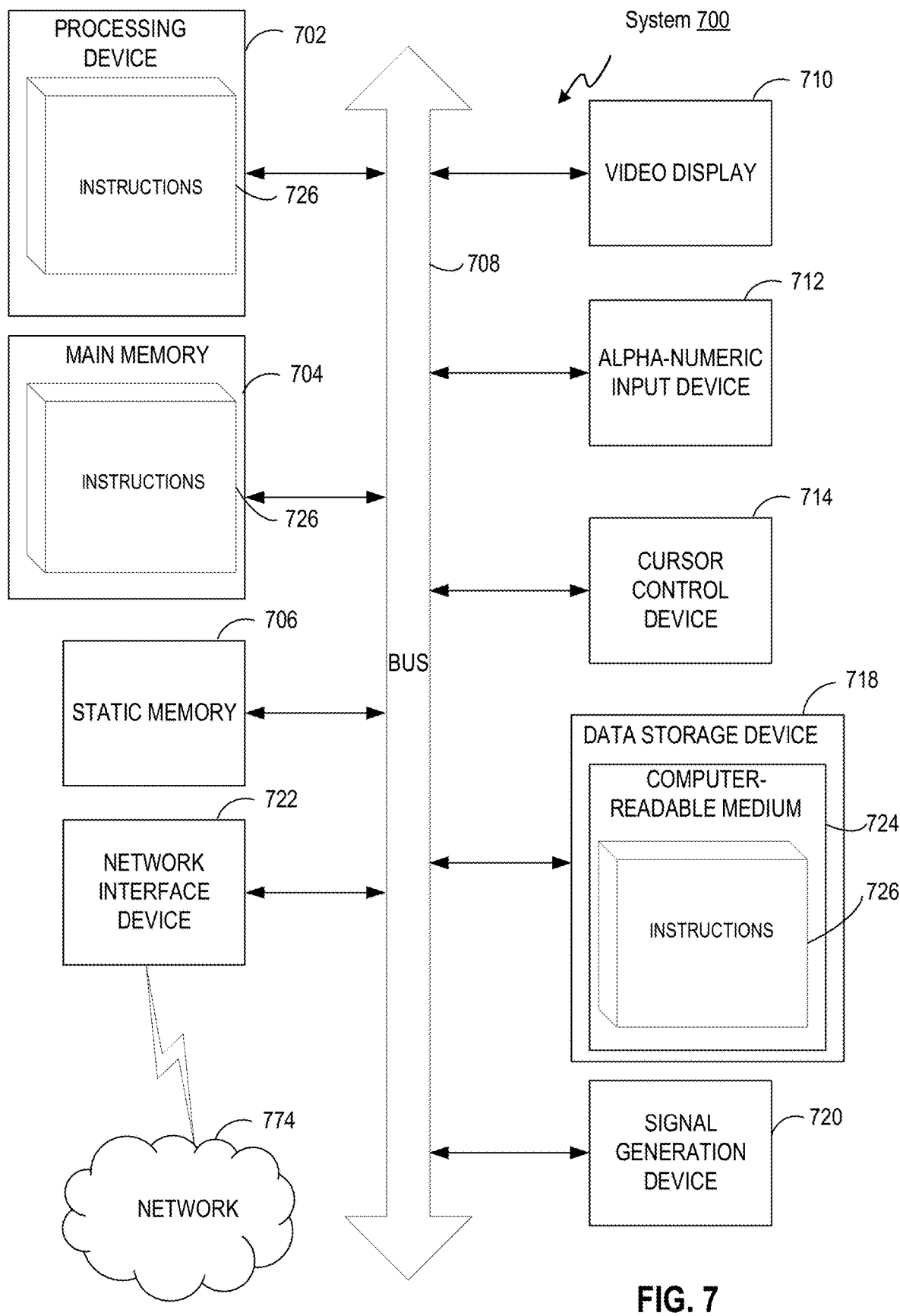
FIG. 7 is a block diagram illustrating an exemplary system architecture, according to some embodiments.

FIG. 7 illustrates a diagrammatic representation of a machine in the exemplary form of a computer system 700 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like, having one or more cores. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein. For example, the processor 702 may execute instructions 726 to perform methods 400, 500, and 600 as shown herein in FIGS. 4, 5, and 6 and to provide the feed service 142 of FIG. 1 and the feed service component 300 of FIG. 3.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a physical keyboard or a virtual keyboard), a cursor control device 714 (e.g., a mouse), and a signal generation device 720 (e.g., a speaker).

The data storage device 718 may include a non-transitory computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for a media providing a media item storage, a metadata service, a feed service, a feed service component, a media viewer or other features which may correspond, respectively, to identically-named counterparts described with respect to FIGS. 1, 2, and 3, and/or a software library containing methods for displaying content in between loops of a looping media item. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
    maintaining subscription data that is stored in a subscription data store, the subscription data specifying a plurality of entities that are each followed by one or more of a plurality of users, each of the plurality of entities being a tagged entity associated with a tag;
    identifying a media item associated with one or more tagged entities of the plurality of entities, wherein the one or more tagged entities are depicted in the media item;

determining, based on the subscription data, a user of the plurality of users that follows the one or more tagged entities depicted in the media item;

providing, for presentation to the user, the media item depicting the one or more tagged entities that are followed by the user;

identifying a channel of media items that includes the media item depicting the one or more tagged entities followed by the user; and providing, for presentation to the user, one or more other media items from the channel that includes the media item depicting the one or more tagged entities followed by the user.

2. The method of claim 1, wherein providing the media item comprises causing the media item to be added to a feed of the user.

3. The method of claim 1, wherein maintaining subscription data further comprises:

recommending to the user that the user follow one or more tagged entities;

receiving a request from the user to follow the one or more tagged entities; and storing an entry in the subscription data store, the entry indicating that the user follows the tagged entities.

4. The method of claim 1, wherein maintaining subscription data further comprises:

monitoring a database of media item metadata, the metadata comprising one or more tags associated with a plurality of media items available in a content-sharing platform;

selecting at least one of the one or more tags; and associating, by a processing device, the at least one tag with a following element in the content-sharing platform, to generate a tagged entity to be followed by one or more of the plurality of users.

5. The method of claim 4, wherein monitoring the database of media item metadata further comprises storing the one or more tags in the database of media item metadata upon upload of a new media item into the content-sharing platform.

6. The method of claim 5, wherein storing the one or more tags in the database of media items upon upload into the content-sharing platform comprises receiving the one or more tags from an uploading user that uploads the new media item into the content-sharing platform.

7. The method of claim 1, wherein maintaining subscription data further comprises:

monitoring a media item consumption history of the user;

identifying another tag associated with another tagged entity not being followed by the user, the other tag occurring multiple times in the media item consumption history of the user; and recommending to the user that the user subscribe to the other tagged entity.

8. The method of claim 1, wherein the tag identifies a person, an object, or a location and the tagged entity permits the user to follow the person, object, or location.

9. The method of claim 1, wherein the channel of media items that includes the media item is associated with another tagged entity.

10. The method of claim 9, wherein the channel is generated by a content-sharing platform based on a prevalence of the other tagged entity in a database of media item metadata.

11. A system comprising:

a memory storing instructions thereon; and a processing device communicably coupled to the memory, the processing device executing the instructions to:

maintain subscription data that is stored in a subscription data store, the subscription data specifying a plurality of entities that are each followed by one or more of a plurality of users, each of the plurality of entities being a tagged entity associated with a tag;

identify a media item associated with one or more tagged entities of the plurality of entities, wherein the one or more tagged entities are depicted in the media item;

determine, based on the subscription data, a user of the plurality of users that follows the one or more tagged entities depicted in the media item;

provide, for presentation to the user, the media item depicting the one or more tagged entities that are followed by the user;

identify a channel of media items that includes the media item depicting the one or more tagged entities followed by the user; and provide, for presentation to the user, one or more other media items from the channel that includes the media item depicting the one or more tagged entities followed by the user.

12. The system of claim 11, wherein the tag identifies a person, an object, or a location and the tagged entity permits the user to follow the person, object, or location.

13. The system of claim 11, wherein the channel of media items that includes the media item is associated with another tagged entity.

14. The system of claim 13, wherein the channel is generated by a content-sharing platform based on a prevalence of the other tagged entity in a database of media item metadata.

15. A non-transitory computer-readable storage medium storing instructions that, when executed by a processing device, cause the processing device to perform operations comprising:

maintaining subscription data that is stored in a subscription data store, the subscription data specifying a plurality of entities that are each followed by one or more of a plurality of users, each of the plurality of entities being a tagged entity associated with a tag;

identifying a media item associated with one or more tagged entities of the plurality of entities, wherein the one or more tagged entities are depicted in the media item;

determining, based on the subscription data, a user of the plurality of users that follows the one or more tagged entities depicted in the media item;

providing, for presentation to the user, the media item depicting the one or more tagged entities that are followed by the user;

identifying a channel of media items that includes the media item depicting the one or more tagged entities followed by the user; and providing, for presentation to the user, one or more other media items from the channel that includes the media item depicting the one or more tagged entities followed by the user.

16. The non-transitory computer-readable storage medium of claim 15, wherein providing the media item comprises causing the media item to be added to a feed of the user.

17. The non-transitory computer-readable storage medium of claim 15, wherein maintaining subscription data further comprises:

recommending to the user that the user follow one or more tagged entities;

receiving a request from the user to follow the one or more tagged entities; and storing an entry in the subscription data store, the entry indicating that the user follows the tagged entities.

18. The non-transitory computer-readable storage medium of claim 15, wherein maintaining subscription data further comprises:

monitoring a database of media item metadata, the metadata comprising one or more tags associated with a plurality of media items available in a content-sharing platform;

selecting at least one of the one or more tags; and associating, by a processing device, the at least one tag with a following element in the content-sharing platform, to generate a tagged entity to be followed by one or more of the plurality of users.

19. The non-transitory computer-readable storage medium of claim 18, wherein monitoring the database of media item metadata further comprises storing the one or more tags in the database of media item metadata upon upload of a new media item into the content-sharing platform.

20. The non-transitory computer-readable storage medium of claim 19, wherein storing the one or more tags in the database of media items upon upload into the content-sharing platform comprises receiving the one or more tags from an uploading user that uploads the new media item into the content-sharing platform.

* * * * *